Feb. 26, 1952
C. O. JETT ET AL
2,587,164
TRAIN APPROACH INDICATOR
Filed June 3, 1949
3 Sheets-Sheet 1
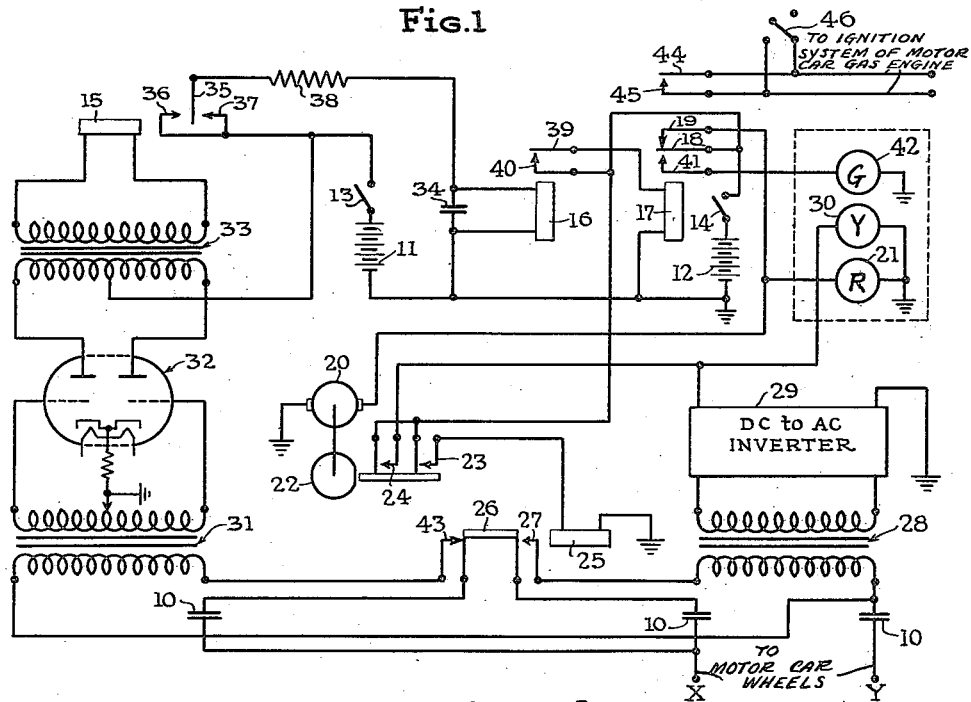
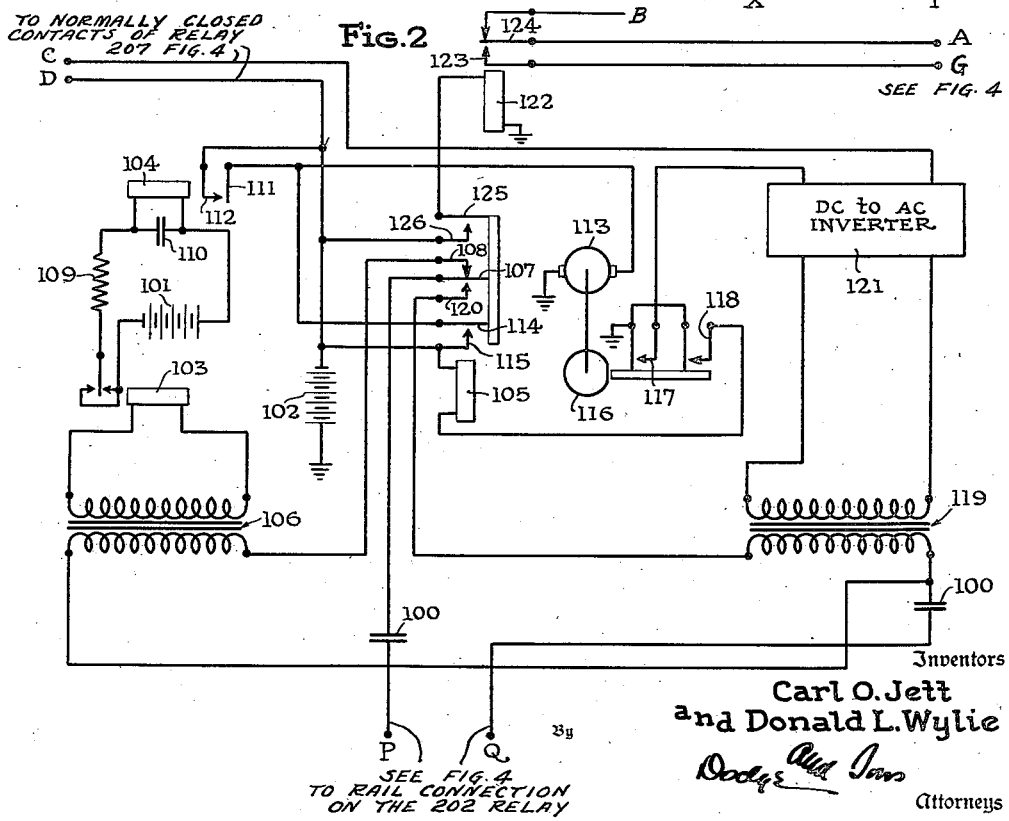
Inventors
Carl O. Jett
and Donald L. Wylie
Attorneys Feb. 26, 1952  C. O. JETT ET AL  2,587,164
TRAIN APPROACH INDICATOR
Filed June 3, 1949 3 Sheets—Sheet 2

INVENTORS
Carl O. Jett
and Donald L. Wylie
BY
Attorneys

INVENTOR.
Carl O. Jett
and Donald Wylie
BY
Attorneys

Patented Feb. 26, 1952

2,587,164

UNITED STATES PATENT OFFICE 2,587,164

TRAIN APPROACH INDICATOR

Carl Otis Jett, Omaha, Nebr., and Donald L. Wylie, Portland, Oreg.

Application June 3, 1949, Serial No. 97,008

11 Claims. (Cl. 246—39)

This invention relates to railroad signalling systems and more particularly to an auxiliary warning system adapted for use in conjunction with an existing block signal installation. While depending on the response of the block signal system for part of its control, the warning system of the present invention will operate without interference to or from the block signal system although it may utilize the same rails for conductors.

This warning system is primarily designed for use in connection with service vehicles such as trackmen's motor cars which are used on the main line tracks and must be so arranged as not to operate the block signals. The necessity for giving the crew of such service vehicle ample warning of the approach from either direction of a high speed train on the same rails and the need for giving the crew of such train warning of the presence of the car on the track are each obvious. To simplify description, the term "train" will be hereinafter used to describe any locomotive or car or train of locomotives, or cars, or both, capable of operating the block signal system, while the term "vehicle" will be used to identify any service vehicle which does not operate the block signal system.

Accordingly, an object of this invention is to provide a reliable warning system for such service vehicles, the warning system operating without interference to the block signal system.

It is a further object of this invention to give simultaneous warning to the locomotive engineer of an approaching train, and to the vehicle operator.

It is another object to give continuous information of rail traffic conditions to the vehicle operator.

Another object is to provide for the "fail safe" principle for all circuit elements of the combined warning and signal systems.

Further objects will be apparent from the following description in conjunction with the attached drawings in which:

Figure 1 is a schematic diagram for the vehicle-carried unit of the warning system.

Figure 2 is a similar diagram for a trackside unit of the warning system.

Figure 4:
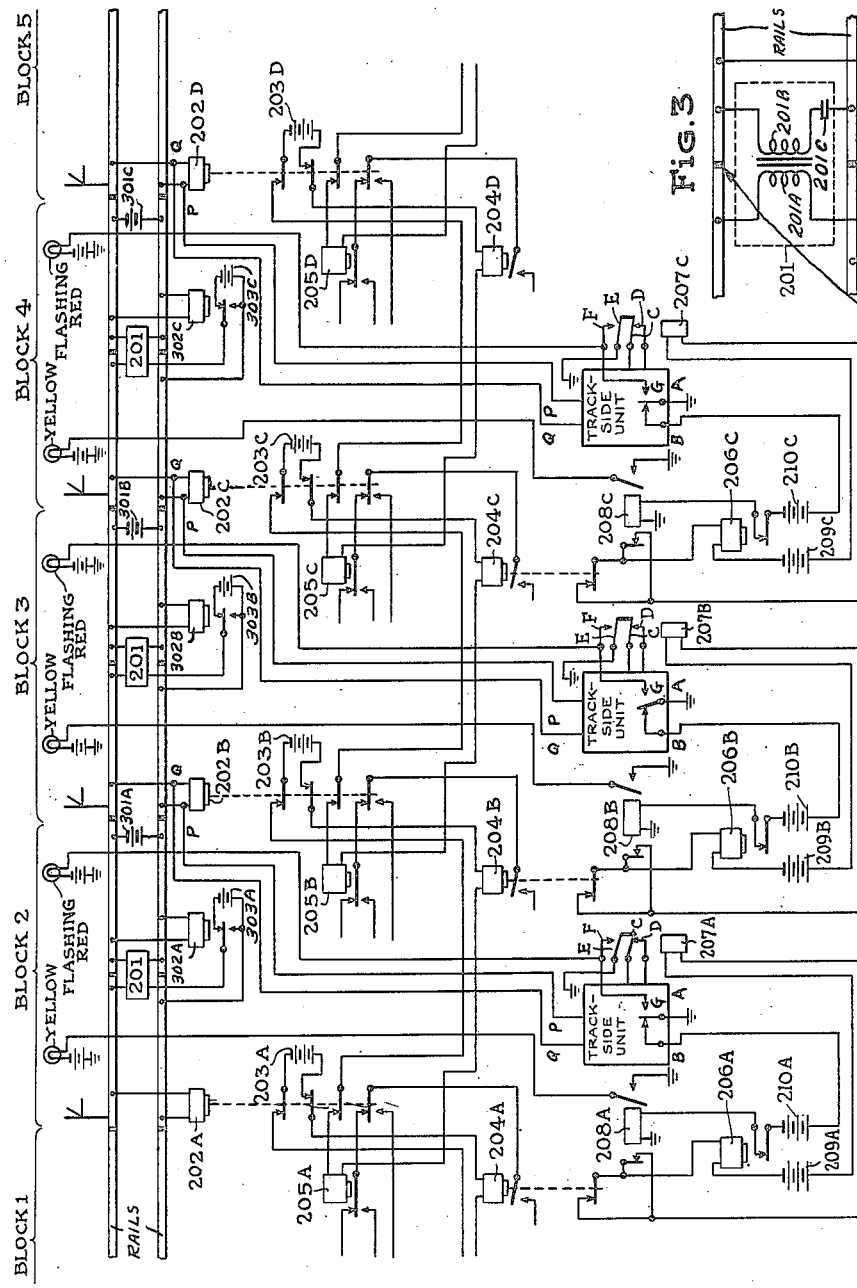
Figure 4 shows the warning system applied to several blocks of one track, and with all relay contacts in their normal position, i. e. in the position which they assume in the absence of all rail traffic.
Figure 5:
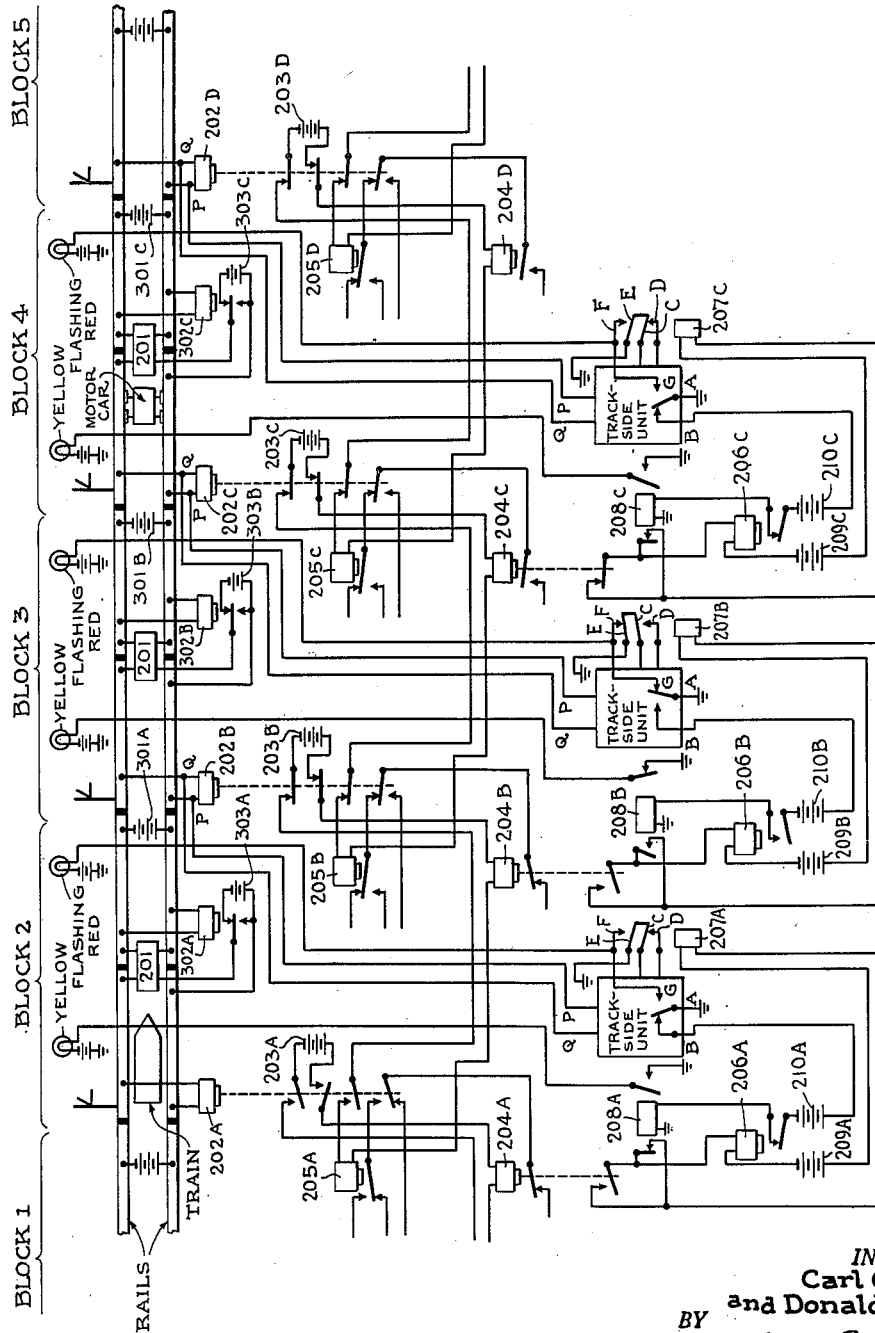

Figure 5 duplicates Figure 4 except that the apparatus is shown therein conditioned by the presence of a train in block 2 and a motor car in block 4.

General description of the system

The warning system as used with any block signal system includes trackside and service vehicle-carried, transmitting and receiving units, which function in interlocked time sequence. The warning system does transmit signals, but to avoid confusion the term "signal" will be reserved for the block signal system so far as practicable in the ensuing description.

Assuming clear track conditions, the scheme of operation of the system is as follows: When the service vehicle is on a track, or conveniently when power is applied to its propelling unit, the vehicle-carried warning unit impresses a cyclic audio frequency voltage on the rails for a short period, conveniently 2 to 4 seconds. These periods alternate with "listening" periods of similar duration in which the unit, having automatically changed over, functions as a receiver. A trackside unit is triggered or activated by said impressed voltage and thereupon, during the listening period of the vehicle-carried unit, impresses a return audio frequency voltage on the rails. This answering voltage is received by the motor car unit, then functioning as a receiver, and is utilized to actuate any suitable indicator on the vehicle, to inform its operator that the track is clear.

The trackside unit is subject to supervisory control by the block signal system, and when that system indicates the approach of a train the trackside unit is rendered unresponsive to the output of the vehicle-carried unit, and so impresses no return voltage on the rails. Failure of the vehicle-carried unit to receive a return voltage from the trackside unit operates the vehicle-carried indicator and warns the vehicle operator to remove the vehicle from the track.

In addition to the warning given to the operator of the vehicle, provision is made for simultaneous warning of the presence of the vehicle by means of trackside displays visible to the operator of an approaching train and also to the operator of any other vehicle on the track.

The triggering voltage impressed on the rails by the vehicle-carried unit, regardless of rail traffic conditions, actuates relays in the trackside apparatus and these in turn control visual or other warning devices which may be mounted either on the wayside signal stand (semaphore) of the block system, or elsewhere, as may be found convenient. Train engineers are thus informed that the track ahead is occupied by a service vehicle and this affords an additional safety factor.

With the above general description in mind, a complete understanding of the operation may be had by reference to the accompanying drawings.

*Vehicle-carried unit*

Figure 1 shows a preferred embodiment of the vehicle-carried apparatus. Since this system uses the rails as conductors, and since it is assumed that the rails are also used as conductors for a block signal system, the vehicle on which this apparatus is mounted must not operate the block signal system. Electrically discontinuous axles, insulated wheels, or other familiar equivalent means are used. Electrical contact with the rails may be achieved in a number of ways, but a preferred expedient would be brushes contacting the wheels. In Figure 1, the leads marked "X" and "Y" typify such brushes. Condensers 10 are used to isolate the warning system from the block signal system. Power for the unit is supplied, for example, by a high voltage dry cell battery 11 and a low voltage wet cell battery 12. Switches 13 and 14 may be on the same shaft and are used to turn the unit on and off. With the power on and no voltage being received from any trackside unit, the operation is as follows:

Relays 15, 16 and 17 will be in their open or unenergized position. Power from battery 12 is, therefore, applied through contacts 18 and 19 to a direct current motor 20. A red warning signal 21 is also energized. The motor drives a cam 22 which will close contacts 23 and 24 in that order. Closing of contact 23 applies the voltage of battery 12 to relay 25 which closes contacts 26 and 27. The latter contacts connect the secondary winding of a matching transformer 28 to the rails through two of the isolating condensers 10. Closing of contact 24 connects the battery 12 to an inverter unit 29, the output of which is connected to the primary winding of matching transformer 28. The inverter may be any one of the several well known types. For example, it may be the vibrator type or the rotary machine type.

For the duration of the closed period of contact 24, a cyclic voltage of the frequency of the inverter unit is impressed on the rails. The duration of application of this voltage is controlled by the cam 22 and the motor speed, and has been assumed to be approximately 2 seconds. During this period, an amber display light 30 is energized by the battery 12 through contact 24. At the end of this period, contacts 24 and 23 open in that order removing power from the inverter unit and from the amber display light.

The transformer 28 is disconnected from the rails by the opening of contacts 26 and 27 and in its place, transformer 31 is connected to the rails through contacts 26 and 43. If the track is clear of train traffic, an answering voltage will be impressed on the rails by the trackside unit in response to the voltage which it received from the vehicle-carried unit. Transformer 31 receives this voltage and feeds it to the grids of an amplifier tube 32. The transformer 31 serves to match the nominal impedance of the rails to the input impedance of the amplifier. The output of the amplifier drives a transformer 33 which matches the output impedance of the amplifier to the impedance of a resonant type relay 15 connected to the secondary of transformer 33.

15 is a highly selective resonant type relay which responds to a single frequency only, and rejects all others. Energization of this relay causes a pulsing direct current voltage to be applied to relay 16 and condenser 34 from battery 11 through contacts 35, 36 and 37 and current limiting resistor 38. Relay 16 is of the high impedance low current type which will operate on voltages from about 6 to 10 volts. The time constant of the circuit including condenser 34, resistor 38, and the winding of relay 16 has a value of about ½ to 2 seconds to prevent relay 16 from falling out in the event of temporary interruption of the received voltage which might occur due to momentary poor contact with the rails. Energization of relay 16 closes contacts 39 and 40 which applies voltage from battery 12 to relay 17 which opens contacts 18 and 19 and closes contacts 18 and 41. The latter contacts apply the voltage from battery 12 to a green signal light 42 which informs the vehicle operator that the track is clear.

At the time of operation of relay 17, in addition to lighting the clear track signal on the vehicle, the amber and red lights on the vehicle are extinguished and voltage is removed from the direct current motor 20. This constitutes one complete cycle of the vehicle-carried unit and relays 15, 16 and 17 will continue in their energized state so long as a voltage impressed on the rails by the trackside unit is being received.

It is convenient but not strictly necessary to have the signal system control the propulsive motor of the service vehicle. Switch 46 is an ignition switch for the propelling engine of the service vehicle and is used in starting the engine. If clear track impulses are being received from a trackside unit, relay 17 will be energized and contacts 44 and 45 will close. When the operator receives a clear track indication, he may set switch 46 to its open position thus subjecting the ignition circuit to control by the signal system. Non-receipt of a clear track impulse then will break the ignition circuit at contacts 44 and 45 and it will thereupon be necessary for the vehicle operator to close switch 46 if (contrary to the usual condition) it is desirable to operate the vehicle when a train is approaching.

*Trackside unit*

The trackside unit is similar in most respects to the vehicle-carried unit and a preferred embodiment is shown diagrammatically in Figure 2 of the attached drawings.

Condensers 100 are used to isolate the unit from the direct current block signal system, and the leads "P" and "Q" are connected directly to the rails. As in the vehicle-carried unit, power is supplied by two batteries. 101 is a dry cell high-voltage battery and 102 is a wet cell low-voltage battery. While the unit is in its dormant state, relays 103, 104 and 105 will not be energized. Matching transformer 106 will be connected to the rails through contacts 107 and 108 and the isolating condensers 100. When the vehicle-carried unit impresses its interrogation voltage on the rails as previously described, this voltage is received by the trackside unit. A voltage is induced thereby in the transformer 106 which operates a resonant type relay 103. This relay is of the same type as relay 15 in Figure 1. The circuit including the battery 101, resistor 109, condenser 110 and high impedance relay 104 operates exactly as in the case of the corresponding elements of the vehicle-carried unit numbered 11, 16, 34 and 38. When relay 104 is energized contacts 111 and 112 close and apply a voltage from battery 102 to the direct current timing motor 113. The timing motor drives a cam 116 which closes contacts 118 and 117 in that order. Closing of 118 locks in relay 105 and deenergizes relays 103 and 104. The transformer 106 is disconnected from the rails and transformer 119 is connected in its place through contacts 107 and 120. Closing of contact 117 completes a circuit from battery 102 through the inverter 121. The cyclic output voltage of the inverter drives the primary of matching transformer 119, the secondary of which is connected to the rails through the isolating condensers 100. The resulting voltage impressed on the rails by the trackside unit and received and amplified by the vehicle-carried unit affords the vehicle operator a clear track signal.

Leads marked "C" and "D" in this figure go to a pair of normally closed relay contacts controlled by the block signal system. Since the circuit from the battery 102 to the inverter 121 must be completed through these leads, the trackside unit cannot transmit an answering impulse unless there is a closed circuit between "C" and "D." A train on the rails will actuate a relay which is part of the block signal system and open the circuit between "C" and "D." This opening can occur even while the trackside unit is functioning as a transmitter. Whenever it occurs the answering voltage from the trackside unit will be interrupted. If the answering impulse is interrupted, the vehicle-carried unit responds by displaying the red warning signal 21 to the vehicle operator, and this display will persist until the trackside unit again transmits an answering impulse indicating that the track is clear.

The direct current motors driving the cams in the two units serve as time sequencing and interlocking means. One unit will always be receiving while the other is transmitting. Each transmission of the trackside unit is in response to an interrogation by the motor car unit, and the duration of transmission is controlled by the motor and cam combination. When the vehicle-carried unit fails to receive an answer from the trackside, its motor and cam continue to operate so that the transmission cycle is repeated until an answer is received. The vehicle-carried unit, therefore, always operates in interrelated timed sequence with a trackside unit. Since the trackside units function as transmitters, only in response to interrogation received from a vehicle-carried unit, the power requirements are small. No current is required by a given trackside unit until a vehicle-carried unit comes into the block served by that unit.

In addition to the warning given the operator of the vehicle-carried unit of the presence of trains, it is usually desirable to advise the engineers of trains of the presence of the vehicle. This can be done in a number of ways. The simplest way is to place flashing red lights on the signal stands for appropriate blocks of the block signal system, for example, just below the standard signal display. A relay such as 122 connected as shown in Figure 2 could be used to control these lights. Contacts 123 and 124 of this relay are normally open. When the trackside unit receives an interrogation from the vehicle-carried unit, the closing of relay 105 applies a voltage from battery 102 to relay 122, closing contact "A" and "G" and opening contacts "A" and "B." These contacts will remain closed even after relays 103 and 104 drop out because the circuit is completed through contacts 125 and 126 of relay 105. The leads marked "A" and "G" in Figure 2 would be connected to a circuit which controls flashing lights or other equivalent warning display along the trackside. (A preferred embodiment of such a circuit is shown in Figure 4 and will be described with reference thereto.)

Application to existing signal systems

This warning system has been designed for application to railroads equipped with block signal systems. Since the rails in successive blocks are insulated from each other, it will be apparent that transmissions by either unit cannot extend beyond the block in which they originate. One trackside unit will be connected to service each insulated block section and, therefore, the vehicle-carried unit will always be interlocked with the one trackside unit which serves the block in which the vehicle is travelling.

Figure 3:
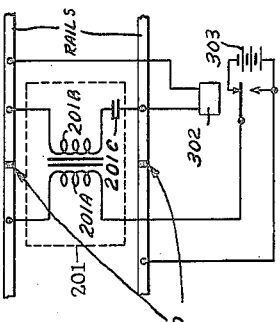
Figure 3 is a diagram of a bypass circuit for the insulated rail sections of the block signal system.

The warning system must be provided with a continuous path throughout each block section for the cyclic audio currents. Since each block section of a standard block system is sectionalized with insulating joints, into a number of shorter D. C. continuous paths, a by-passing connection which will pass the cyclic current of the warning system around these insulated joints, but which will not derange the block system is necessary. Otherwise a transmission by either a vehicle-carried unit or a trackside unit would not extend throughout the block in which it originates. By-passing can be provided for in a number of ways, but a preferred embodiment is indicated generally by the numeral 201 and is shown in detail in Figure 3. A one-to-one ratio audio transformer is used to pass the cyclic current around the insulated section and isolating condensers in series with the leads prevents shunting of the block signal system. Relays 302 are normally energized by current from the batteries 301. The direct current circuit link of the block system is completed for each block through the normally closed contacts of relay 302, the battery 303 and winding 201-A of the one-to-one ratio transformer. Condenser 201-C in series with winding 201-B prevents shunting of the block signal system.

Figure 4 shows schematically, application of the warning system to one track of a main line. As previously described, warning to the operator of the vehicle carrying the apparatus of this invention depends on non-receipt of voltage impulses from the trackside transmitter associated with the block in which the vehicle is travelling. The response of the block system to the presence of rail traffic is, therefore, utilized to disable the trackside units ahead of the train in order to provide the necessary advance warning.

That part of a block signal system is typified by the circuits shown in Figure 4. Relays 202 connected across the rails at the entrance to each block control application of voltage from a battery 203 to a series circuit consisting of relays 204 and 205. Relays 204 in turn control relays 206, 207 and 208 which are associated with each trackside unit.

As a practical matter, it has been determined that a distance of about two blocks would be covered by a train travelling at streamliner speed in the time necessary to stop a moving service vehicle and remove it from the tracks. On this basis, a distance greater than two, but less than three, blocks will be adopted as a reasonably safe protection distance.

Figure 4 shows five blocks of a main line with the warning system applied to three of the blocks shown. The operative tie-in with a standard block signal system is also shown.

The various relay contacts are illustrated in Figure 4 as occupying their normal positions corresponding to the absence of both rail traffic and motor cars from any of the blocks shown.

Relays 208a, 208b, and 208c are shown controlling a pair of contacts at either end of the relay coil. In their normally energized state, the contacts to the left of the coil will be closed and those to the right will be open.

Referring now to Figure 5 for a description of the operation of the system, this figure shows the position of the various relay contacts when a train is occupying block #2 and a service vehicle is occupying block #4. As soon as the train enters block #2 it will shunt relay 202-A connected across the rails at the entrance to that block. (In the absence of rail traffic "trains" within the block, relays 202 are normally energized.) The shunting effect of the train de-energizes relay 202-A.

Inasmuch as the service vehicle is occupying block #4, the operation of the trackside apparatus (Figure 2) directly is confined to block #3 and indirectly the trackside unit of block #3 is interlocked to block #2 for indication of the approach of a train.

The de-energizing of relay 202-A sets up the following sequence of operation: The series circuit consisting of relays 204-B and 205-A and battery 203-B is broken. The opening of normally energized relay 204-B breaks a series circuit consisting of relays 206-B, 207-B and battery 209-B. The opening of normally energized relay 204-B can open this series circuit because relay 208-B has been de-energized and one set of contacts of this relay is connected in parallel across the contacts, in this series circuit, of the 204-B relay. Relay 208-B is de-energized by the operation of the trackside unit (Figure 2) relay 122 which relay opens (when energized) contacts A and B and closes contacts A and G. Relay 122 is energized only when the trackside unit is responding to the interrogation signal of the vehicle carried unit. Thus it can be seen that the opening of relay 204-B will have no effect on the series circuit consisting of relays 206-B, 207-B and battery 209-B unless a vehicle is operating in in block #3.

The flashing red light can only be energized therefor, when two conditions are met, namely:

(1) The trackside unit must be electrically interlocked with a service vehicle unit in order for relay 122 to be energized which opens the circuit between leads A and B and closes the circuit between leads A and G.

(2) A train must have shunted one of the 202 relays within a distance of less than three blocks from the service vehicle to break the series circuit consisting of relays 206, 207 and battery 209.

Assuming that these conditions are met, the flashing red display will be energized and will persist until the trackside unit completes its cycle. If the service vehicle has been removed from the tracks in the meantime, condition 1 can no longer be met and the red display will not be reenergized at the completion of the trackside unit's cycle.

Opening of relay 206-B when relay 208-B is de-energized breaks the circuit from the battery 210-B to relay 208-B to lock in the yellow warning signal at the entrance to block #3 that was set up when relay 208-B was de-energized by the operation of relay 122 (Figure 2) opening contacts A and B. In the event the service vehicle was not in blocks #3 or #4, the de-energizing of relay 204-B would not open the series circuit consisting of relays 206-B, 207-B and battery 209-B because the contacts of relay 208-B would still be closed, holding relay 206-B up. Therefore, the yellow warning signal would not be energized. When relay 207-B is opened, contacts C and D are opened which disables the trackside unit serving block #4 and thereby removes application of cyclic voltage from the rails in block #4 as described with reference to Figure 2. This also allows contacts E and F to close and energizes a flashing red light at the entrance to block #4 in which the vehicle is operating. The operator of the approaching train therefore will see a yellow light at the entrance to block #3 which indicates a vehicle is being operated in block #4. Unless the vehicle has been removed from the tracks by the time the train reaches the entrance to block #4, the train operator will then see the flashing red light at the entrance to that block.

As described with reference to Figure 1, interruption of the cyclic audio current from the trackside unit causes the vehicle-carried unit to energize a red warning display on the vehicle. This sequence of events described herewith reference to the five blocks of Figure 4 will apply to all blocks of the line which are equipped with the apparatus as shown. Both the train operator and the vehicle operator are thus informed of the other's presence on the rails which provides a considerable safety factor.

Starting with the premise that a clear track indication to the operator of a motor car carrying the apparatus of this invention is dependent upon receipt of a signal from the trackside apparatus, it is evident that the system as a whole operates on the "fail safe" principle. Warnings depend on non-receipt of a signal. Therefore, anything which would prevent normal receipt of a signal, whether or not one is being transmitted, results in a warning display and thus contributes to the inherent safety of the system.

Visible and audible signals are interchangeable and may be selected from a range common in the signal art.

Amplifying circuits and isolating means are likewise subject to variation.

The circuit for controlling the trackside apparatus from the block signal system is illustrative of a principle and known expedients are within contemplation.

We claim:

1. A warning system for use on railroads having a block signaling installation in which the rails are used as conductors, said system being adapted for use with vehicles which travel on the rails without causing operation of the block signals, said warning system comprising: at least one vehicle-carried cyclic signal-transmitting and receiving unit; a trackside cyclic signal-transmitting and receiving unit associated with each block section; means for electrically coupling each of said units to the rails; relay means controlled by the response of a track relay of said block system to traffic conditions, for controlling the signal transmissions of said track-side units; electrical time-sequencing means forming a part of each of said units and for interlocking a trackside and a vehicle-carried unit, whereby one unit so interlocked is transmitting while the other is receiving; and indicating means on said vehicle, controlled by said vehicle-carried unit, to continuously inform the vehicle operator of traffic conditions within a preselected number of blocks from said vehicle.

2. A warning system for use on railroads having a block signaling installation, in which the rails are used as conductors and in which adjoining blocks are insulated from each other, said system being adapted for use with vehicles which travel on the rails without causing operation of the block signals, said warning system comprising: means for bypassing the insulated rail joints within each block for cyclic currents; at least one vehicle-carried cyclic signal transmitting and receiving unit; track-side cyclic signal transmitting and receiving units; means for electrically coupling each of said units to the rails; relay means controlled by the response of a track relay of the block signal system to traffic conditions, for controlling the signal transmissions of said track-side units; electrical time-sequencing means forming a part of each unit for interlocking a vehicle-carried and a track-side unit, whereby one unit so interlocked is transmitting while the other is receiving; indicating means on said vehicle controlled by said vehicle-carried unit, to continuously inform the vehicle operator of traffic conditions within a preselected number of blocks from said vehicle; and track-side indicating means including a relay which forms a part of a track-side unit for continuously informing other rail traffic of the presence of a vehicle within said predetermined block distance.

3. The combination of a railway block signal system in which the rails serve as conductors and are subdivided into block signal circuits which are closed when the rails are electrically connected by a train; and a warning means for protecting a service vehicle temporarily operated on the track used and incapable of closing block signal circuits, said warning means comprising: a track-side transmitting and receiving unit associated with each block to which the warning system is applied; at least one vehicle-carried transmitting and receiving unit; timing means forming a part of each unit for controlling the transmitting and receiving functions of each unit in interrelated time sequence with one another; a first warning means mounted on said vehicle and controlled by said vehicle-carried unit; a second warning means mounted along the track-side and controlled by said track-side unit; and track relay means forming a part of said block signal system for disabling said track-side units for a predetermined number of blocks ahead of an approaching train.

4. A track-side unit for use in a railroad warning system as defined by claim 1, the said unit comprising in combination: a cyclic signal-transmitting circuit which includes a source of direct current, and an inverter unit driven thereby; a cyclic signal receiving circuit which includes relay means, indicator means controlled by said relay means and a plurality of sources of direct current connected to furnish power to said relay and indicator means; transformer means connecting said circuits to the rails; timing means for controlling the transmitting and receiving functions of said unit in interlocked time sequence with one or more vehicle-carried units; and a normally closed circuit element in the transmitting circuit, said element being connected to open said circuit in response to the presence of rail traffic within a preselected number of blocks of said track-side unit.

5. A vehicle-carried unit for use in a railroad warning system as defined by claim 1, said unit comprising in combination: a cyclic signal transmitting circuit which includes a source of direct current and an inverter unit driven thereby; a cyclic signal receiving circuit when includes an amplifier, relay means connected to the output of said amplifier, indicator means controlled by said relay means and a plurality of sources of direct current connected to furnish power to said amplifier relay means and indicator means; transformer means connecting said circuits to the rails; and timing means for interlocking the transmitting and receiving functions of said unit with a track-side unit.

6. A track-side unit for use in a railroad warning system as defined by claim 1, said unit comprising in combination: a cyclic signal transmitting circuit which includes a source of direct current, an inverter unit connected to be powered by said source, a transformer connected to couple the output of said inverter to the rails, and a normally closed element in circuit with said source and said inverter which is opened by the response of a track relay of the block signal system to the presence of said traffic; a cyclic signal receiving circuit which includes a resonant relay, a transformer connected to couple cyclic rail voltages to said relay, a source of direct current, a direct current relay connected to be powered by said source whenever said resonant relay is energized and means controlled by said direct current relay to activate said transmitting circuit; timing means including a source of direct current and a motor connected to be powered by said source, said timing means controlling the duration of the transmitting cycle.

7. A vehicle-carried unit for use in a railroad warning system as defined by claim 1, said unit comprising in combination: a cyclic signal transmitting circuit which includes a source of direct current, an inverter unit connected to be powered by said source, and a transformer connected between the output of said inverter unit and the rails; a cyclic signal receiving circuit which includes a source of direct current, an amplifier connected to said source, a transformer connected to couple cyclic voltages in the rails to the input of said amplifier, a resonant relay coupled to the output of said amplifier, a direct current relay connected to be energized by said direct current source whenever said resonant relay is energized, and display means controlled by said direct current relay; timing means including a source of direct current and a motor adapted to be powered thereby, said timing means serving to time the functions of said unit so that recurrent short transmission cycles alternating with receiving cycles continue until an answering transmission is received from the track-side unit, said answering transmission locking said unit in receiving function; and indicating means including a plurality of warning devices, and a source of direct current therefor, said devices being controlled by the transmitting and receiving functions of said unit.

8. A warning vehicle-carried unit for use on a railroad vehicle in cooperation with a similar track-side unit to warn the vehicle operator of an approaching train, comprising in combination: a cyclic signal-transmitting circuit which includes a source of direct current, and an inverter unit driven thereby; a cyclic signal receiving circuit which includes an amplifier, relay means connected to the output of said amplifier, indicator means controlled by said relay means and a plurality of sources of direct current connected to supply power to said amplifier relay means and indicator means; transformer means connecting said circuits to the rails; and timing means for interlocking the transmitting and receiving functions of said unit with a track-side unit.

9. A warning track-side unit for use on a railroad in cooperation with a similar vehicle-carried unit to warn the vehicle operator of an approaching train, comprising in combination: a cyclic signal-transmitting circuit which includes a source of direct current, and an inverter unit driven thereby; a cyclic signal receiving circuit which includes relay means, warning means controlled by said relay means and a plurality of sources of direct current connected to power said relay means and warning means; transformer means connecting said circuits to the rails; timing means for controlling the transmitting and receiving functions of said unit in interlocked time sequence with one of more vehicle-carried units; and a normally closed circuit element in the transmitting circuit, said element being connected to disable said circuit in response to the presence of a train within a preselected distance of said unit.

10. A signaling unit for use on a railroad vehicle in cooperation with a similar track-side unit to warn the vehicle operator of an approaching train, comprising in combination: a cyclic signal transmitting circuit which includes a source of direct current, an inverter unit connected to be powered by said source, and a transformer connected to couple the output of said inverter unit to the rails; a cyclic signal receiving circuit which includes a source of direct current, an amplifier connected to be powered by said source, a transformer connected to couple cyclic voltages in the rails to the input of sand amplifier, a resonant relay coupled to the output of said amplifier a direct current relay connected to be energized by said direct current source whenever said resonant relay is energized, and display means connected to be controlled by said direct current relay; timing means including a source of direct current and a motor connected to be powered thereby, said timing means serving to control the functions of said unit so that recurrent short transmission cycles alternating with receiving cycles continue until an answering transmission is received from the track-side unit, said answering transmission serving to lock said unit in receiving function; and indicating means including a plurality of warning devices, and a source of direct current therefor, said devices being controlled by the transmitting and receiving functions of said unit.

11. A track-side signaling unit for use on a railroad in cooperation with a similar vehicle-carried unit to warn the vehicle operator of an approaching train, comprising in combination: a cyclic signal transmitting circuit which includes a source of direct current, an inverter unit connected to be powered by said source, a transformer connected to couple the output of said inverter to the rails, and a normally closed element in circuit with said source and said inverter, said element serving to disable said circuit in response to the presence of a train within a preselected distance of said unit; a cyclic signal receiving circuit which includes a resonant relay, a transformer connected to couple cyclic rail voltages to said relay, a source of direct current, a direct current relay connected to be powered by said source whenever said resonant relay is energized, and means controlled by said direct current relay to activate said transmitting circuit; timing means including a source of direct current and a motor connected to be powered by said source, said timing means controlling the duration of the transmitting cycle.

CARL OTIS JETT.
DONALD L. WYLIE.

REFERENCES CITED

The following references are of record in the file of this patent:

UNITED STATES PATENTS

| Number | Name | Date |
|---|---|---|
| 2,110,166 | Nicolas | Mar. 18, 1938 |